Figure 1:
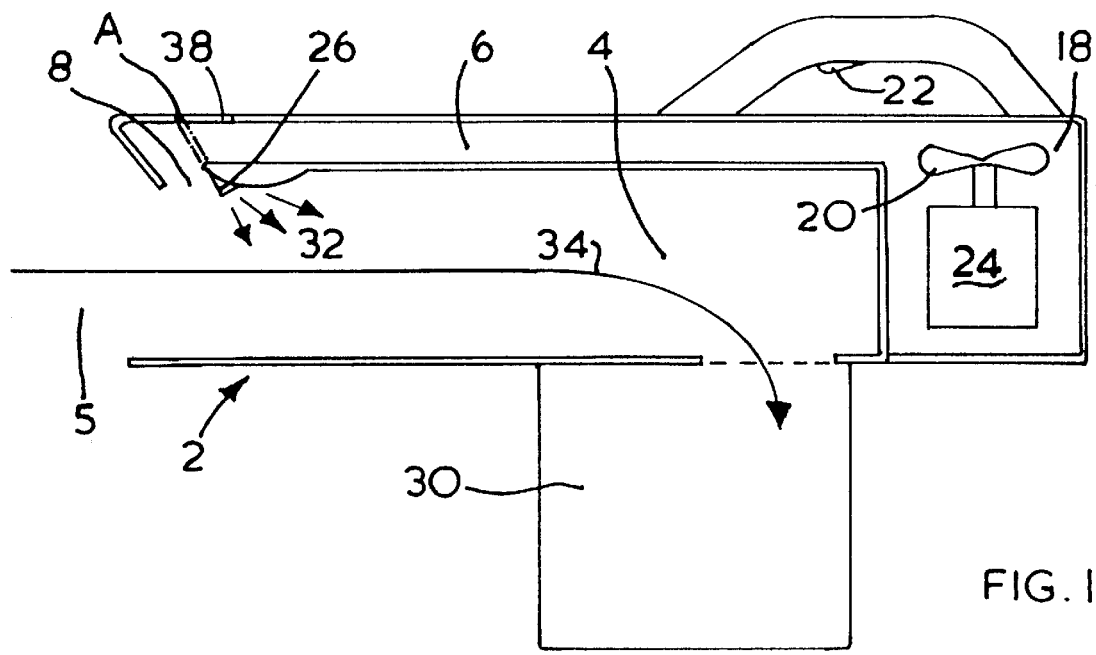

United States Patent [19]
Webster

[11] Patent Number: 5,768,743
[45] Date of Patent: Jun. 23, 1998

[54] DEBRIS COLLECTING APPARATUS

[75] Inventor: Craig Webster, Jesmond, United Kingdom

[73] Assignee: Black & Decker Inc., Newark, Del.

[21] Appl. No.: 598,774

[22] Filed: Feb. 9, 1996

[30] Foreign Application Priority Data

Feb. 11, 1995 [GB] United Kingdom ................ 9502682

[51] Int. Cl.$^6$ ..................................................... A47L 5/18
[52] U.S. Cl. ................................ 15/330; 15/344; 15/409
[58] Field of Search ........................................ 15/409, 330

[56] References Cited

U.S. PATENT DOCUMENTS

| | | | |
|---|---|---|---|
| 3,704,482 | 12/1972 | Brannon | 15/409 X |
| 5,280,667 | 1/1994 | Coathupe | 15/409 |
| 5,287,586 | 2/1994 | Dentzau . | |
| 5,450,649 | 9/1995 | Turnbull | 15/330 |
| 5,477,585 | 12/1995 | Hentzschel et al. | 15/330 |

FOREIGN PATENT DOCUMENTS

| | | |
|---|---|---|
| 0443882 | 8/1991 | European Pat. Off. . |
| 0587272 | 3/1994 | European Pat. Off. . |
| 0599477 | 6/1994 | European Pat. Off. . |
| WO9324045 | 12/1993 | WIPO . |

Primary Examiner—Chris K. Moore
Attorney, Agent, or Firm—Charles E. Yocum; Kerry H. Owens

[57] ABSTRACT

A clean fan debris collecting apparatus is disclosed in which the suction of debris is performed by an entrained stream of air (34). The apparatus comprises a motor (24) which drives an impeller (20) which generates at air steam which is directed down an air supply duct (6). The air stream is then directed into a collecting duct (4) through an air inlet (8) which is located adjacent to a collecting mouth (5) of the collecting duct. The air stream, upon entering the collecting duct (4) generates the entrained stream of air (34) which sucks debris into the collecting mouth (5) and transports it up the collecting duct (4) to a collecting bag (30). An air stream dispersing apparatus (26) is located adjacent to the air inlet (8) to disperse the air stream as it enters to collecting duct (4). This dispersion improves the efficiency with which the entrained stream of air can be generated. Alternatively the air inlet (8) can be formed to include the static air dispersing apparatus.

7 Claims, 2 Drawing Sheets

DEBRIS COLLECTING APPARATUS

The present invention relates to a debris collecting apparatus, in particular a garden debris collecting apparatus. The debris collecting apparatus is preferably of the kind which may be used, either in a vacuum mode to suck debris into the apparatus using an entrained stream of air, or in a blowing mode to discharge stream of air from a nozzle so that debris can be blown into piles, ready for collection.

It is known for example from European Patent No 0443882 to provide a debris collecting apparatus in which debris is sucked up at a collecting mouth of a collecting duct by an entrained stream of air. The entrained stream of air carries the debris up the collecting duct to a collecting bag. One or more air inlets are located adjacent to the collecting mouth from which air is discharged into the collecting duct. This discharged air is directed up into the collecting duct and generates the entrained stream of air. The walls of the collecting duct near to the air inlets are contoured so that a major part of the air flow from the one or more air inlets stays close to the walls of the duct.

It is desirable that the entrained air flow is generated as efficiently as possible so that a less powerful and thus a lighter motor can be used to power the debris collecting apparatus. This makes the apparatus lighter and easier to operate. Therefore it is an object of the present invention to provide a debris collecting apparatus with efficient air entrainment.

Accordingly the present invention provides a debris collecting apparatus comprising:

a collecting duct having a debris collecting mouth at one end, means for creating an air stream, an air inlet into the collecting duct located adjacent to the debris collecting mouth for discharging the air stream into the collecting duct in a flow direction towards the end of the duct away from the debris collecting mouth, characterised in that the apparatus additionally comprises:

static air directing means arranged to disperse the air stream in the collecting duct in a plurality of directions predominantly in said flow direction.

The dispersal of a substantial part of the air stream in a range of directions, mainly away from the walls of the collecting duct, facilitates efficient generation of an entrained air stream. This entrained air stream sucks the debris into the collecting mouth and up the collecting duct in the flow direction.

The static air directing means replaces the conventional smooth surface located in the collecting duct over which the air stream is directed in known debris collecting apparatus of this type. An air stream moving over a smooth surface will tend to follow that surface (the Coander effect) and so will not be dispersed.

Therefore, the air directing means should present a surface to the air stream which comprises a plurality of discontinuities which have the affect of dispersing the air stream.

Preferably, the static air directing means comprises a plurality of surfaces over which the air stream from the air inlet is directed and which diverge in the flow direction, as this is an efficient way of dispersing the air. The surfaces may be flat.

The static air directing means can conveniently be located on a wall of the collecting duct to the side of the air inlet away from the debris collecting mouth. Alternatively, the air inlet can be shaped to form the static air directing means.

In a preferred embodiment of the present invention the static air directing means is formed by a series of spatially separated vanes. Preferably the vanes have a triangular cross section.

The debris collecting apparatus may be provided with a switching arrangement so that the apparatus can be switched between a vacuum mode and a blowing mode.

The debris collecting apparatus may have more than one air inlet, each air inlet having an associated static air directing means.

Figure 2:
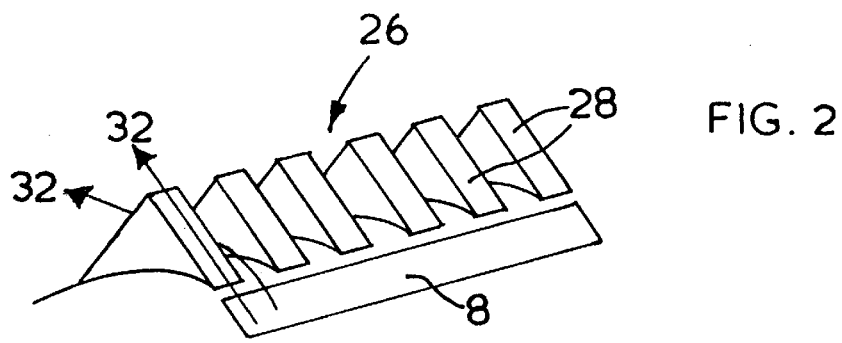
Figure 3:
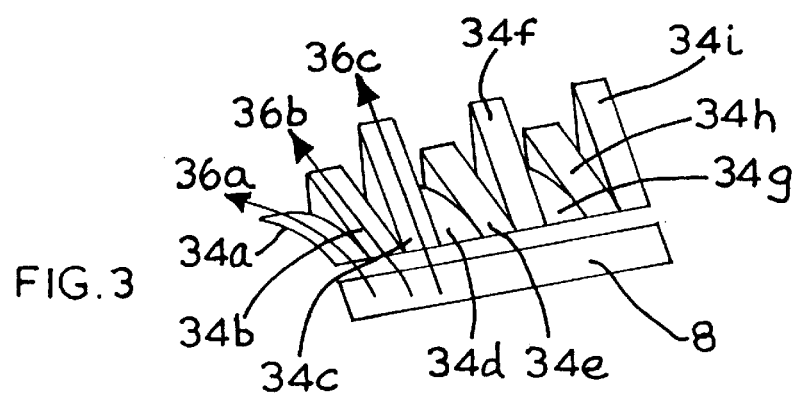
Figure 4:
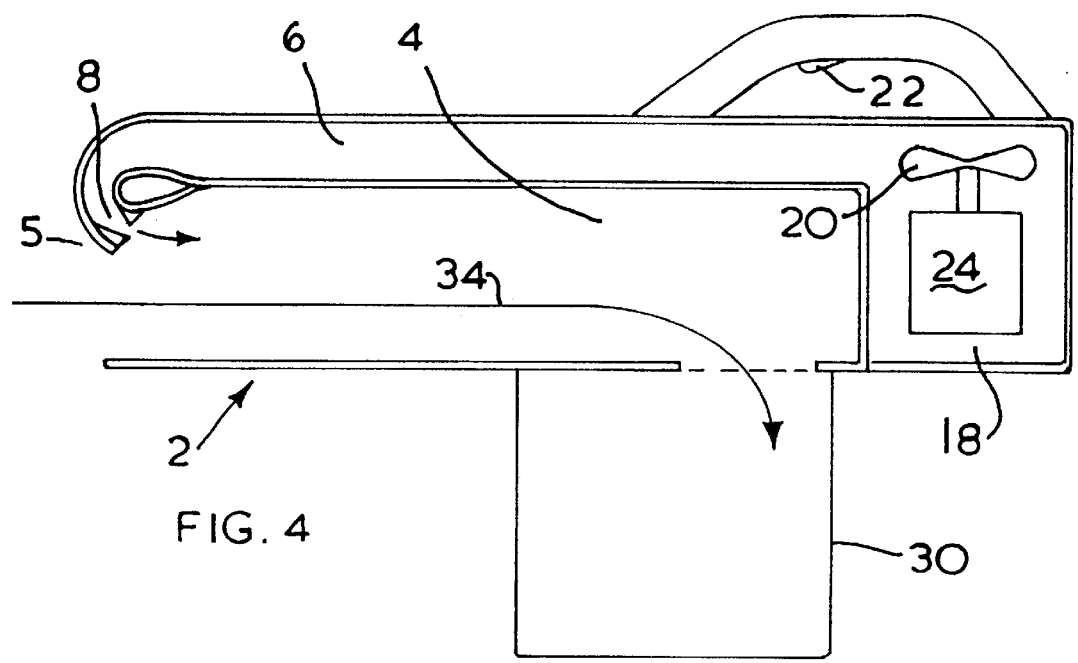
Figure 5:
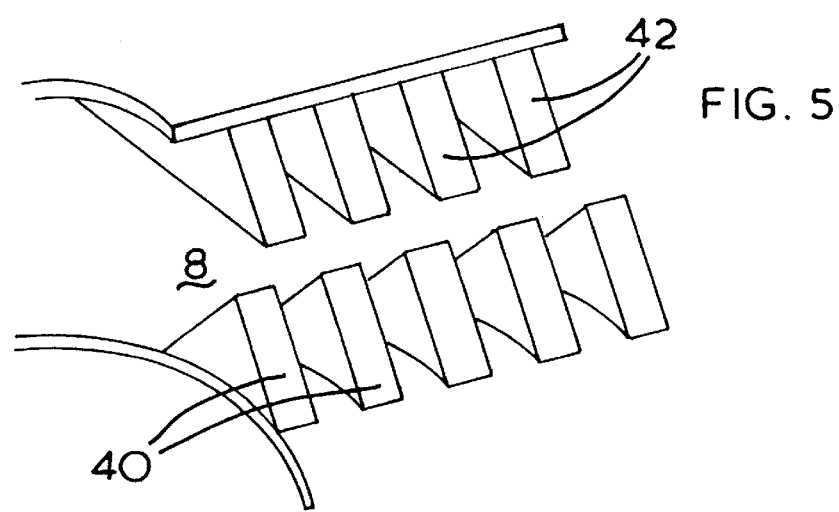

The invention will now be further described with reference to the accompanying drawings in which:

FIG. 1 is a longitudinal cross section of a first embodiment of a debris collecting apparatus according to the invention, FIG. 2 is a perspective view of the static air directing means of the first embodiment of the present invention, FIG. 3 is a perspective view of the static air directing means of a second embodiment of the present invention, FIG. 4 is a longitudinal cross section of a third embodiment of a debris collecting apparatus according to the present invention in which the air inlet is formed to be the static air directing means, and FIG. 5 is a perspective view of the air inlet shown in FIG. 4.

As can be seen from FIG. 1 a debris collecting apparatus shown generally at (2), comprises a collecting duct (4), having a debris collecting mouth (5) and an air supply duct (6) extending parallel to the collecting duct (4). The air supply duct (6) has an air inlet (8) adjacent to the collecting mouth (5). The end of the air supply duct (6) opposite to the air inlet (8) terminates in a chamber (18). In the chamber (18) is located an impeller (20) powered by a motor (24). A collecting bag (30) is attached to the end of the collecting duct (4) opposite to the collecting mouth (5).

In use the operator of the debris collecting apparatus activates a switch (22) to turn on the motor (24) which operates the impeller (20). The air stream created by the impeller (20) flows down the air supply duct (6) and into the collecting duct (4) through the inlet (8). On being expelled from the inlet (8) the air stream encounters static air directing means (26) which is shown in more detail in FIG. 2. The static air directing means comprises a plurality of vanes (28) of triangular cross section. The vanes distribute the air stream coming from the inlet (8) in a plurality of directions as shown schematically by the arrows (32) in FIG. 1 and FIG. 2, predominantly in a flow direction towards the end of the duct away from the collecting mouth. The thus dispersed air stream efficiently generates an entrained air stream shown by the arrow (34) which sucks up debris through the collecting mouth (5) and transports it up the collecting duct (4) and into the collecting bag (30).

As an alternative to the static air directing means shown in FIG. 2, that shown in FIG. 3 can be used. The static air directing means shown in FIG. 3 comprises a series of discrete surfaces (34a to 34i) which diverge in the flow direction. The different orientations of the surfaces causes dispersion of the air in a plurality of directions as shown by arrows (36a to 36c) in FIG. 3.

It will be obvious to the person skilled in the art that there are other alternatives to the static air directing means shown in FIGS. 2 and 3, that may be used to, disperse the air stream from the air inlet (8).

The end of the air supply duct (6) adjacent to the air inlet (8) is provided with a switch means (38) by which the air flow can be selectively directed either to create a vacuum airflow or a blowing airflow. The switch means (38) comprises a flap pivoted at (A) between a first position (shown in solid lines in FIG. 1) in which the air flow generated by the impeller (20) is directed from the air stream duct into the collecting duct and the apparatus functions as a debris collector. When the flap is pivoted into the second position (shown in dotted lines in FIG. 1) the air flow generated by the impeller (20) is directed away from the collecting duct (4) and the apparatus functions as a blower.

FIGS. 4 and 5 show a further embodiment of the present invention which works in a similar way to the embodiments discussed above. Like features are indicated with like numbers. In the apparatus of FIGS. 4 and 5 the air inlet (8) is shaped to form the static air directing means. The inlet (8) comprises two series of vanes (40) and (42) which are offset with respect to each other. The air stream from the air supply duct (6) in dispersed by the series of vanes (40,42) in the collecting duet (4) as it flows through the air inlet (8).

What is claimed is:

1. A debris collecting apparatus comprising:

a collecting duct having a debris collecting mouth at one end, means for creating an air stream, an air inlet into the collecting duct located adjacent to the debris collecting mouth for discharging the air stream into the collecting duct, in a flow direction towards the end of the duct away from the debris collecting mouth, and static air directing means arranged to disperse the air stream in the collecting duct in a plurality of directions, predominantly in the flow direction, wherein the static air directing means comprises a series of spatially separated vanes.

2. A debris collecting apparatus according to claim 1 wherein the static air directing means comprises a plurality of surfaces which diverge in the flow direction.

3. A debris collecting apparatus according to claim 2 wherein the surfaces are flat.

4. A debris collection apparatus according to claim 1, wherein the static air directing means is located on a wall of the collecting duct to the side of the air inlet away from the debris collecting mouth.

5. A debris collecting apparatus according to claim 1, wherein the air inlet is shaped to form the static air directing means.

6. A debris collecting apparatus according to claim 1 wherein the vanes have a triangular cross section.

7. A debris collecting apparatus comprising:

a collecting duct having a debris collecting mouth at one end;

means for creating an air stream;

an air inlet into the collecting duct located adjacent to the debris collecting mouth for discharging the air stream into the collecting duct, in a flow direction towards the end of the duct away from the debris collecting mouth;

static air directing means arranged to disperse the air stream in the collecting duct in a plurality of directions, predominantly in the flow direction; and a switching arrangement that allows the debris collecting apparatus to be switched between a vacuum mode and a blowing mode.

* * * * *